United States Patent
Lee et al.

(10) Patent No.: US 9,218,416 B2
(45) Date of Patent: Dec. 22, 2015

(54) METHOD FOR FORMING DATABASE ON BASIS OF RELATIONSHIP BETWEEN VIDEO DATA, AND DATABASE FORMATION SYSTEM

(75) Inventors: Jaehyung Lee, Gyeonggi-do (KR); Chung-won Seo, Seoul (KR); Yong-joo Hong, Seoul (KR); Kang-san Lee, Seoul (KR)

(73) Assignee: Enswers, Co., LTD, Seoul (KR)

( * ) Notice: Subject to any disclaimer, the term of this patent is extended or adjusted under 35 U.S.C. 154(b) by 268 days.

(21) Appl. No.: 13/813,620

(22) PCT Filed: Jul. 18, 2011

(86) PCT No.: PCT/KR2011/005261
§ 371 (c)(1),
(2), (4) Date: Apr. 15, 2013

(87) PCT Pub. No.: WO2012/018183
PCT Pub. Date: Feb. 9, 2012

(65) Prior Publication Data
US 2013/0198215 A1   Aug. 1, 2013

(30) Foreign Application Priority Data

Aug. 2, 2010   (KR) .................. 10-2010-0074659

(51) Int. Cl.
*G06F 17/30*   (2006.01)

(52) U.S. Cl.
CPC .... *G06F 17/30858* (2013.01); *G06F 17/30823* (2013.01)

(58) Field of Classification Search
CPC ................................................ G06F 17/30858
See application file for complete search history.

(56) References Cited

U.S. PATENT DOCUMENTS

| | | | |
|---|---|---|---|
| 2002/0059272 A1* | 5/2002 | Porter | 707/100 |
| 2002/0169745 A1* | 11/2002 | Hotti et al. | 707/1 |
| 2005/0076055 A1* | 4/2005 | Mory et al. | 707/104.1 |
| 2005/0223038 A1 | 10/2005 | Shin et al. | |
| 2006/0036558 A1* | 2/2006 | Moore et al. | 707/1 |
| 2011/0022638 A1* | 1/2011 | Jiang | 707/797 |
| 2012/0290950 A1* | 11/2012 | Rapaport et al. | 715/753 |

FOREIGN PATENT DOCUMENTS

JP   2006-106964 A   4/2006

OTHER PUBLICATIONS

International Search Report, mailing date Dec. 23, 2011 for corresponding International Application No. PCT/KR2011005261 with English translation.

* cited by examiner

*Primary Examiner* — Mohammad S Rostami

(57) ABSTRACT

The present invention relates to a method and system for constructing a database (DB) based on mutual relations between pieces of video data. The present invention provides the method of constructing a DB based on mutual relations between pieces of video data, including 1) generating one or more nodes so that pieces of identical video data are included in an identical node, 2) generating pieces of node information about respective generated nodes, 3) comparing comparison target video data with pieces of video data of the respective nodes, and then setting relations between the comparison target video data and the pieces of video data of the respective nodes, and 4) updating pieces of node information about the respective nodes, based on the set relations, and also provides a DB construction system using the method.

11 Claims, 12 Drawing Sheets

NODE INFORMATION

| NODE ID | VIDEO DATA | LOCATION INFORMATION | EDGE INFORMATION |
|---|---|---|---|
| A |  | www.abc.com/abc<br>www.def.com/def |  |

(a) DIFFERENCE (b) COMPLETE
    IDENTICALNESS

■ original
▨ matched
□ mismatched (c) INCLUDING (d) BEING INCLUDED (e) PARTIALLY
    COMPLETE
    OVERLAPPING (f) PARTIALLY
    INCOMPLETE
    OVERLAPPING

NODE INFORMATION

| NODE ID | VIDEO DATA | LOCATION INFORMATION | EDGE INFORMATION |
|---|---|---|---|
| A | ////// | www.abc.com/abc<br>www.def.com/def | E: INCLUDED |

NODE INFORMATION

| NODE ID | VIDEO DATA | LOCATION INFORMATION | EDGE INFORMATION |
|---|---|---|---|
| E | ////////// | www.ghi.com/ghi | A: INCLUDING |

NODE INFORMATION

| NODE ID | EDGE INFORMATION |
|---|---|
| A | B:INCLUDING, C:PARTIALLY COMPLETE OVERLAPPING, D: PARTIALLY INCOMPLETE OVERLAPPING |
| B | A: INCLUDED, E: PARTIALLY INCOMPLETE OVERLAPPING |
| C | A: PARTIALLY COMPLETE OVERLAPPING, D: INCLUDING |
| D | A: PARTIALLY INCOMPLETE OVERLAPPING, C: INCLUDED |
| E | B: PARTIALLY INCOMPLETE OVERLAPPING |

METHOD FOR FORMING DATABASE ON BASIS OF RELATIONSHIP BETWEEN VIDEO DATA, AND DATABASE FORMATION SYSTEM

TECHNICAL FIELD

The present invention relates, in general, to a method and system for constructing a database (DB) and, more particularly, to a method and system for constructing a DB which makes it possible to compare pieces of video data with each other, set mutual relations for identicalness between the pieces of video data, and determine efficiently the mutual relations between the pieces of video data based on the set mutual relations for identicalness.

BACKGROUND ART

With the development of Internet technology, a great amount of data is present on the Internet. In particular, recently, cases where video data is uploaded or downloaded, or where video data is provided in real time using a streaming service have greatly increased. Further, video data services gradually occupy a larger part of even web services, such as various types of search portal websites, blogs, cafes, or mini-homepages. Furthermore, there are many cases where pieces of video data, such as video data related to broadcasts or movies, are provided over the Internet.

In particular, cases where original video data is edited or adapted by a plurality of users and is provided in a modified form on the web have also increased. Further, for example, a plurality of episodes appear as separate video data within a single drama series, and a piece of video data of one hour or longer in which a plurality of short music videos are compiled may be present. Furthermore, a case where part of a specific drama is included in video data edited by a user as a part of the video data may exist. If relations between pieces of video data, which are present to be modified or edited in various forms as above, can be detected, identical or similar pieces of video data present in various forms on the network may be conveniently searched for. Further, the copyrights management of the video data may also be conveniently performed. Furthermore, if mutual relations between pieces of video data that are present in various forms on the web, but have a predetermined common relation can be detected, it is possible to utilize the video data as advertisement data or as other pieces of additional data based on the mutual relations. However, a conventional video DB is limited in that it simply stores only information about individual pieces of video data without reflecting such mutual relations.

DISCLOSURE

Technical Problem

Accordingly, the present invention has been made keeping in mind the above limitations, and an object of the present invention is to provide a method and system that are capable of constructing a video database (DB) based on mutual relations between pieces of video data.

Another object of the present invention is to provide a method and system that are capable of constructing a video ontology DB by defining mutual relations between pieces of video data so that the video DB can be constructed based on the mutual relations between the pieces of video data.

A further object of the present invention is to provide a method and system that construct a video DB based on mutual relations between pieces of video data, thus conveniently and efficiently classifying and determining mutual relations between a large number of pieces of video data scattered on the web depending on the types of relations, and also classifying the type of information which specific video data has from the statistical characteristics of the relations.

Yet another object of the present invention is to construct a video DB based on mutual relations between pieces of video data, thus efficiently providing various types of supplementary services, such as video data searching, rights management, and advertising services, for example, viral marketing.

Technical Solution

In order to accomplish the above objects, the present invention provides a method of constructing a database (DB) based on mutual relations between pieces of video data, including 1) generating one or more nodes so that pieces of identical video data are included in an identical node; 2) generating pieces of node information about respective generated nodes; 3) comparing comparison target video data with pieces of video data of the respective nodes, and then setting relations between the comparison target video data and the pieces of video data of the respective nodes; and 4) updating pieces of node information about the respective nodes, based on the set relations.

In this case, the node information at 2) may include node identifier information uniquely assigned to each node.

Further, the node information at 2) may include information about a physical location at which the video data is located.

Furthermore, each relation between the comparison target video data and the pieces of video data set at 3) may correspond to at least one of a case where the comparison target video data is different from all of the pieces of video data of the respective nodes, a case where the comparison target video data is completely identical to one of the pieces of video data of the respective nodes, and a case where the comparison target video data partially overlaps at least one of the pieces of video data of the respective nodes.

Furthermore, if the relation is set as the case where the comparison target video data is different from all of the pieces of video data of the respective nodes, 4) may be configured such that a new node is generated, the comparison target video data is included in the new node, and node information about the new node is generated.

Furthermore, if the relation is set as the case where the comparison target video data is completely identical to one of the pieces of video data of the respective nodes, 4) may be configured such that the comparison target video data is included in a node including the completely identical video data, and node information about the node is updated.

Furthermore, the case where the comparison target video data partially overlaps at least one of the pieces of video data of the respective nodes may be one of a case where the comparison target video data includes at least one of the pieces of video data of the respective nodes, a case where the comparison target video data is included in at least one of the pieces of video data of the respective nodes, a case where a part of the comparison target video data completely overlaps at least one of the pieces of video data of the respective nodes, and a case where a part of the comparison target video data incompletely overlaps at least one of the pieces of video data of the respective nodes.

Furthermore, 4) may include 4-1) determining to which one of the overlapping cases a current case corresponds; 4-2) generating a new node; 4-3) updating node information about the overlapping nodes in correspondence with each overlapping case; and 4-4) updating node information about the new node in correspondence with each overlapping case.

Further, 4-3) and 4-4) may be configured to generate information about each overlapping case as edge information indicating a connecting relationship between the new node and the overlapping nodes, and update the edge information so that the edge information is included in the node information.

In accordance with another aspect of the present invention, there is provided a system for constructing a database (DB) based on mutual relations between pieces of video data, including a comparison unit for comparing comparison target video data with pieces of video data stored in a DB, and setting mutual relations between the pieces of video data; a DB management unit for generating one or more nodes and pieces of node information so that pieces of identical video data are included in an identical node, and managing pieces of node information about respective nodes based on mutual relations set by the comparison unit comparing the comparison target video data with the pieces of video data stored in the DB; and the DB for storing the nodes and the node information generated by the DB management unit, and storing the pieces of video data in correspondence with respective nodes, based on related data generated and updated by the DB management unit depending on the mutual relations set by the comparison unit.

Further, the comparison unit may compare the comparison target video data with the pieces of video data of the nodes stored in the DB, and set each mutual relation as at least one of a case where the comparison target video data is different from all of the pieces of video data of the respective nodes, a case where the comparison target video data is completely identical to one of the pieces of video data of the respective nodes, and a case where the comparison target video data partially overlaps at least one of the pieces of video data of the respective nodes.

Furthermore, if the mutual relation is set as the case where the comparison target video data is different from all of the pieces of video data of the respective nodes, the DB management unit may be configured such that a new node is generated, the comparison target video data is included in the new node, and node information about the new node is generated.

Furthermore, if the mutual relation is set as the case where the comparison target video data is completely identical to one of the pieces of video data of the respective nodes, the DB management unit may be configured such that the comparison target video data is included in a node including the completely identical video data, and node information about the node is updated.

Furthermore, the case where the comparison target video data partially overlaps at least one of the pieces of video data of the respective nodes may be one of a case where the comparison target video data includes at least one of the pieces of video data of the respective nodes, a case where the comparison target video data is included in at least one of the pieces of video data of the respective nodes, a case where a part of the comparison target video data completely overlaps at least one of the pieces of video data of the respective nodes, and a case where a part of the comparison target video data incompletely overlaps at least one of the pieces of video data of the respective nodes.

Furthermore, the DB management unit may determine to which one of the overlapping cases a current case corresponds, generates a new node, update node information about the overlapping nodes in correspondence with each overlapping case, and update node information about the new node in correspondence with each overlapping case.

Advantageous Effects

According to the present invention, there can be provided a method and system that are capable of constructing a video DB based on mutual relations between pieces of video data.

Further, according to the present invention, there can be provided a method and system that are capable of constructing a video ontology DB by defining mutual relations between pieces of video data so that the video DB can be constructed based on the mutual relations between the pieces of video data.

Furthermore, according to the present invention, there is an advantage in that a method and system can be provided which construct a video DB based on mutual relations between pieces of video data, thus conveniently and efficiently classifying and determining mutual relations between a large number of pieces of video data scattered on the web depending on the types of relations, and also classifying the type of information which specific video data has from the statistical characteristics of the relations.

Furthermore, the present invention is advantageous in that it constructs a video DB based on mutual relations between pieces of video data, thus efficiently providing various types of supplementary services, such as video data searching, rights management, and advertising services, for example, viral marketing.

BEST MODE

Hereinafter, embodiments of the present invention will be described in detail with reference to the attached drawings.

Figure 1:
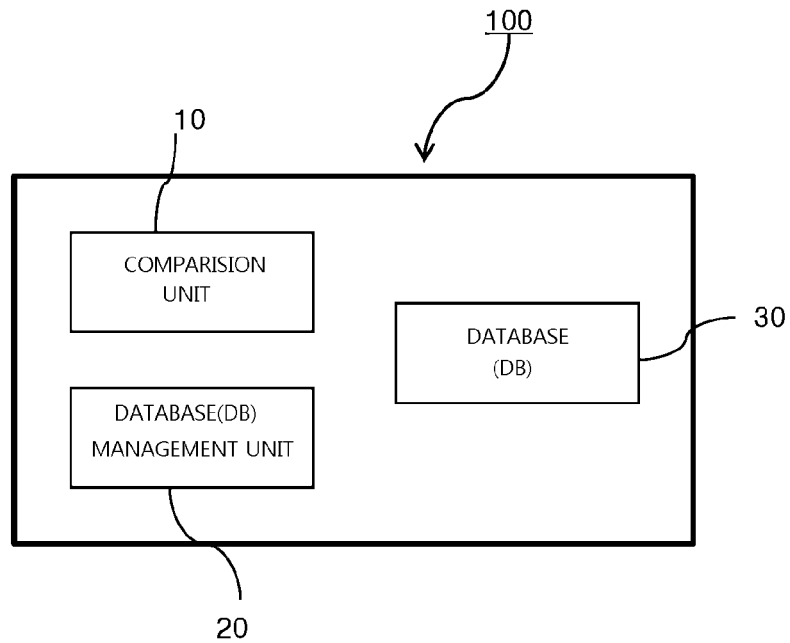
FIG. 1 is a diagram showing the configuration of an embodiment for performing a method of constructing a DB based on mutual relations between pieces of video data according to the present invention.

FIG. 1 is a diagram showing the configuration of an embodiment of a system for performing a method of constructing a database (DB) based on mutual relations between pieces of video data according to the present invention and schematically illustrating the overall concept of the present invention.

Referring to FIG. 1, the overall concept of the present invention will be described in brief below. Referring to FIG. 1, a system 100 for performing a method of constructing a DB based on mutual relations between pieces of video data according to the present embodiment (hereinafter simply referred to as a "DB construction system") includes a comparison unit 10, a DB management unit 20, and a database (DB) 30.

The comparison unit 10 functions to compare comparison target video data with pieces of video data stored in the DB 30, and set mutual relations between the comparison target video data and the stored video data. Here, the term "mutual relation" denotes a relation corresponding to one of difference, complete identicalness, and overlapping between pieces of video data to be compared with each other.

The DB management unit 20 performs a management function, such as the generation and updating of various types of related data so that pieces of video data can be stored in the DB 30 in correspondence with the mutual relations set by the comparison unit 10 depending on the mutual relations.

The DB 30 functions to store the pieces of video data in correspondence with the mutual relations set by the comparison unit 10 using the pieces of related data generated and updated by the DB management unit 20 depending on the mutual relations. The DB 30 may include and store all types of data required to implement the method of the present invention.

The operation of the DB construction system 100 having the above configuration will be described in brief below.

First, in the DB 30, one or more nodes are generated so that pieces of identical video data are included in the same node, and pieces of node information about respective generated nodes are generated. Here, the term "identical" means that pieces of information are completely identical, that is, means that the entirety of a piece of video data from beginning to end is completely identical to that of another piece of video data. In other words, a single node is composed of only pieces of identical video data.

In this state, when comparison target video data (target data to be classified in the DB) is input, the comparison target video data is compared with pieces of video data of respective nodes, and relations between the comparison target video data and the pieces of video data of the respective nodes are set. Here, the term "relation" means at least one relation of "difference", "complete identicalness", and "overlapping", as described above.

If the relations have been set, pieces of node information about the respective nodes are updated based on the set relations. This "updating" means that related node information in the DB is revised in such a way as to generate a new node based on each relation (in the case of difference and overlapping), or to include video data in an existing node (in the case of complete identicalness), and to store and update information corresponding to the relation in each piece of node information.

Next, a method of constructing a DB based on mutual relations between pieces of video data, which is performed under the configuration of FIG. 1, will be described in detail with reference to drawings from FIG. 2.

Figure 2:
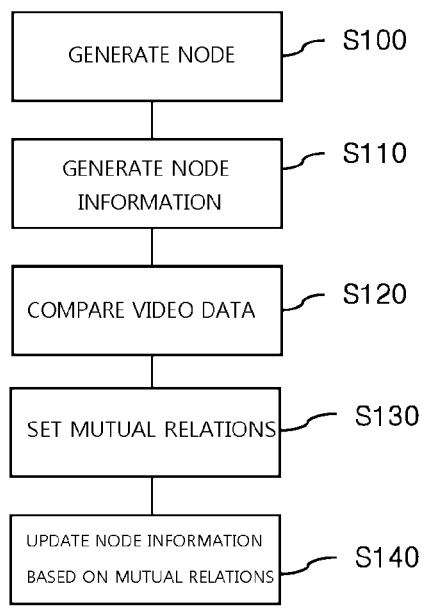
FIG. 2 is a flowchart showing an embodiment of a method of constructing a DB based on mutual relations between pieces of video data according to the present invention.

FIG. 2 is a flowchart showing an embodiment of a method of constructing a DB based on mutual relations between pieces of video data according to the present invention.

Referring to FIG. 2, the DB construction system 100 generates one or more nodes so that pieces of identical video data are included in the same node (S100), and pieces of node information about respective generated nodes are generated (S110).

Figures 3, 4:
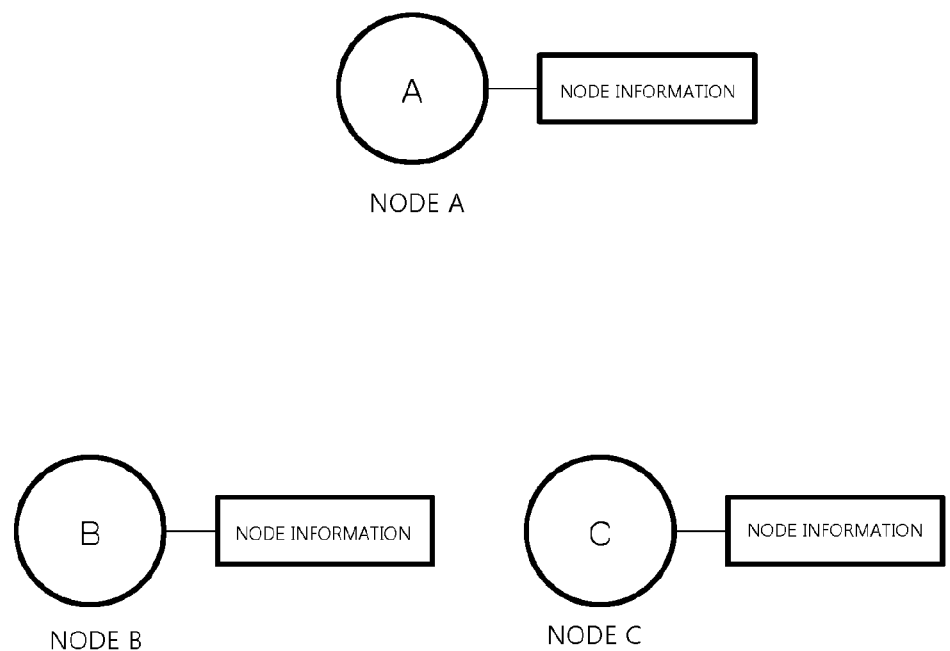
FIGS. 3 and 4 are diagrams showing examples of nodes and node information generated at steps S100 and S110.

FIGS. 3 and 4 are diagrams showing examples of nodes and node information generated at steps S100 and S110. Referring to FIG. 3, it can be seen that three nodes A, B, and C are generated, and pieces of node information are generated for respective nodes. It is assumed that each node is configured to include only pieces of completely identical video data when it is generated in an initial state. Also, it is assumed that video data included in same node are distinguishable with video data included in other nodes, that is, overlapping portions are not present between video data in a node and video data in other node.

For example, in a case where video data having the file name "abc.avi" is present in location information "www.abc.com/abc" and video data having the file name "def.avi" is present in location information "www.def.com/def" on Internet websites, if the two pieces of video data are completely identical from beginning to end despite the file names thereof being different from each other, the pieces of video data are regarded as identical video data, and may be included in the same node (for example, node A of FIG. 4). In this case, as shown in FIG. 4, a video data field is required to store video data itself, wherein two pieces of video data are identical to each other, so that it is sufficient to store only one of the two pieces of video data, and respective pieces of physical address information (location information), that is, "www.abc.com/abc" and "www.def.com/def," can be stored as node information in the location information.

In this way, nodes are generated so that pieces of non-overlapping video data, that is, distinguishable video data, belong to different nodes and pieces of identical video data belong to a single same node, and so that node information can be generated for each node, as illustrated in FIG. 4.

The node information of FIG. 4 may include a node Identifier (ID) field that is the unique identifier of each node, a video data field for storing video data itself, as described above, and a location information field for representing information about a physical location at which each piece of video data is present on the web. Here, it is apparent that video data is separately stored in the DB 30 without being stored in the video data field, and that the video data field stores the internal location information of the DB 30. Further, the node information may include an edge information field, wherein edge information is required to store information indicative of mutual relations with other nodes depending on the mutual relations, which will be described later. At the above-described steps S100 and S110, the nodes are each composed of different pieces of video data and there is no relation therebetween, so that the edge information field is in an empty state, and the corresponding relations are recorded later depending on mutual relations with other pieces of video data. This operation will be described in detail below. Further, it is apparent that node information may also be configured to store other additional information, such as the size of data, time information, copyrights information or metadata information, in addition to the information shown in FIG. 4.

Referring back to FIG. 2, in a state in which nodes and node information are generated at steps S100 and S110, if comparison target video data is input, the comparison target video data is compared with the pieces of video data in respective nodes (S120), and mutual relations between the comparison target video data and the pieces of video data of the respective nodes are set (S130).

Here, the term "comparison target video data" denotes target video data to be newly added to the video DB. Methods for comparing such comparison target video data with the pieces of video data of the respective nodes can be implemented using conventional well-known video data comparison methods. Methods of determining whether pieces of video data are identical to each other by comparing the piece of video data may be implemented using, for example, methods of extracting fingerprints and comparing the fingerprints with each other, as well known in the prior art. The use of fingerprints can be implemented using audio fingerprints and/or video fingerprints. However, since the present invention must set mutual relations at step S130, it must be able to determine all mutual relations including a relation in which pieces of video data partially overlap each other, without being limited to the simple determination of whether pieces of video data are identical, based on a comparison between the pieces of video data. Therefore, at step S120, it is preferable to use a comparison method capable of determining even whether pieces of video data to be compared are completely identical or completely different from each other, or whether the pieces of video data partially overlap each other. Further, since the cases where pieces of video data partially overlap each other include a case where one piece of video data includes or is included in the other piece of video data, and a case where parts of the pieces of video data completely or incompletely overlap each other, comparison methods capable of determining relations even in cases such as those must be used.

As examples of such a comparison method, there can be used comparison methods filed by the present applicant and disclosed in Korean Patent Application No. 10-2007-0044251 (entitled "Method and apparatus for generating audio fingerprint data and method and apparatus for comparing audio data using the same"), Korean Patent Application No. 10-2007-0054601 (entitled "Method and apparatus for determining identicalness of video data and detecting an identical section"), Korean Patent Application No. 10-2007-0060978 (entitled "Method and system for clustering pieces of video data having identicalness among pieces of video data"), and Korean Patent Application No. 10-2007-0071633 (entitled "Method and apparatus for providing a video data search service using video data clusters").

In accordance with technologies disclosed in the patent application filed by the present applicant, it may be determined not only whether pieces of video data to be compared have identicalness, but also whether pieces of video data are partially identical, that is, whether they partially overlap each other, as well as whether they are completely identical, by exactly detecting which section is identical, which section is non-identical, etc., with respect to individual sections. In addition, information about a section in which the pieces of video data overlap each other may also be exactly detected.

By using the comparison technologies disclosed by the present applicant, the pieces of video data are compared, and mutual relations between the pieces of video data that are compared may be set by exactly determining the mutual relations, that is, relations indicating whether the pieces of video data are completely identical, are different from each other, or partially overlap each other, at steps S120 and S130. When the above-described comparison technologies of the present applicant are used, the node information of FIG. 4 may include fingerprint information used in comparison. Of course, in addition to the fingerprint information, any type of information used in comparison, for example, feature data indicating the features of the corresponding video data, for example, DNA information, may be included in the node information.

The present invention is not intended to provide a method itself of comparing pieces of video data, and such a comparison method can be implemented using any type of conventional technology, in addition to the technologies disclosed in the patents filed by the present applicant, as long as the conventional technology can clearly discriminate the above-described mutual relations from one another, and thus an additional detailed description thereof will be omitted.

Figure 5:
FIG. 5 is a diagram showing mutual relations between pieces of video data to be compared.
Figure 5:
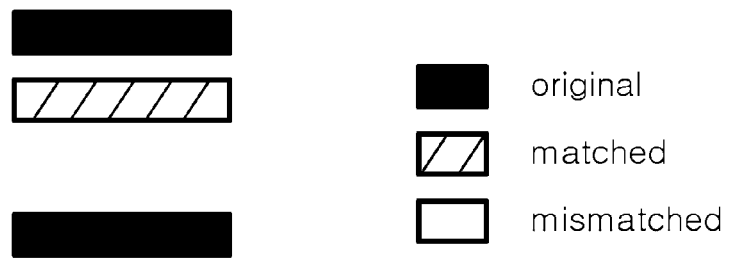
Figure 5:
Figure 5:
Figure 5:
Figure 5:

FIG. 5 is a diagram showing mutual relations between pieces of video data to be compared, as described above.

Referring to FIG. 5, relations denote mutual relations when pieces of video data are compared with each other, wherein six cases, including (a) difference, (b) complete identicalness, (c) including, (d) being included, (e) partially complete overlapping, and (f) partially incomplete overlapping, are illustrated. Among the relations, (c) to (f) belong to partially overlapping forms.

Referring back to FIG. 2, when the mutual relation between the comparison target data and the piece of video data of each node, which corresponds to one of the relations shown in FIG. 5, is set at steps S120 and S130, the node information about each node is updated based on the set mutual relation (S140).

The updating of the node information may be performed depending on the individual cases of FIG. 5 as follows.

Figure 6:
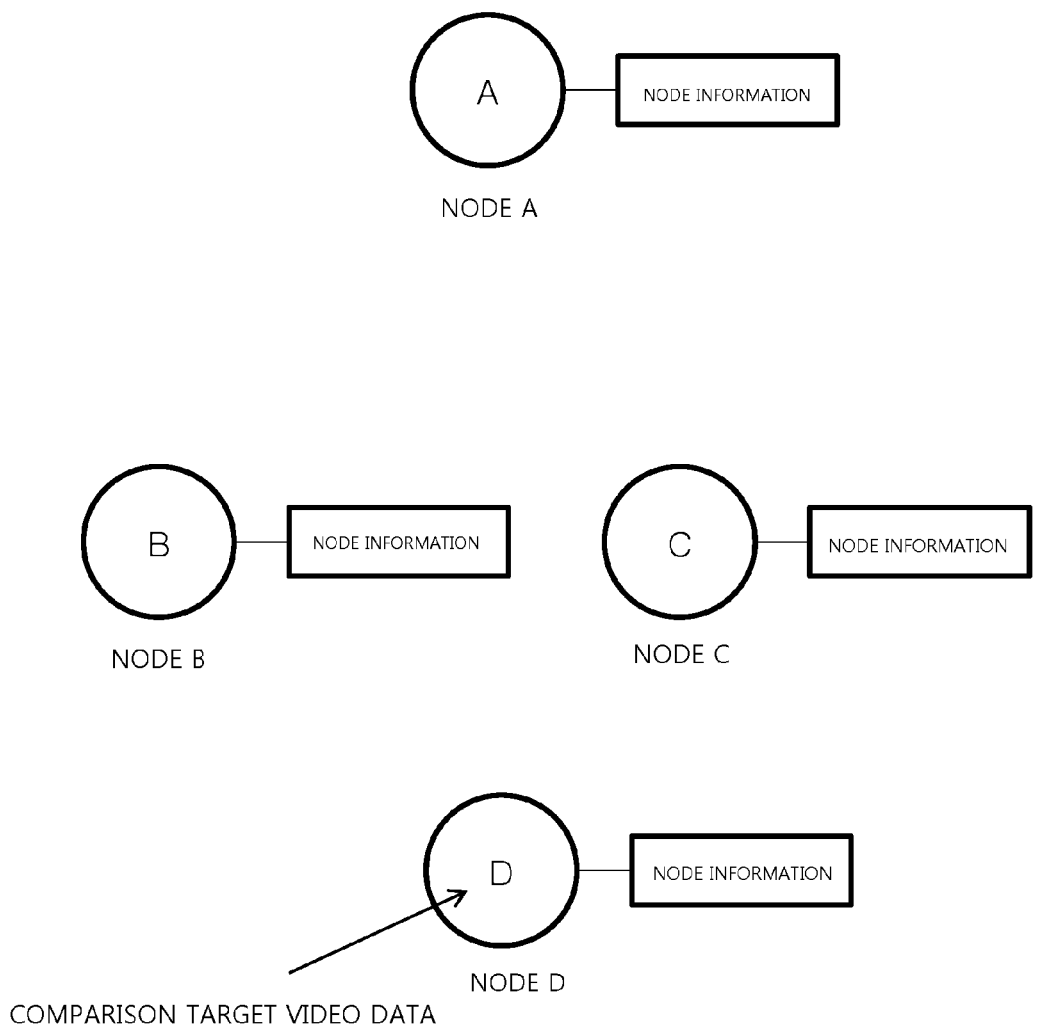
FIGS. 6 to 8 are diagrams showing examples of nodes and node information.

First, if the mutual relation is set as a case where the comparison target video data is different from all pieces of video data of the respective nodes ((a) of FIG. 5), the comparison target video data is a new video data having no relation with any previously generated nodes, so that a new node is generated, the comparison target video data is included in the generated new node, and then node information about the new node is generated. This is performed in a manner similar to that of steps S100 and S110 of FIG. 2. In this case, the new node, that is, the node including the comparison target video data, is not related to existing nodes, and thus edge information (see FIG. 4) indicating mutual relations with other nodes does not need to be especially added or updated. In this form, the existing nodes and the newly generated new node (node D) are shown in FIG. 6. As shown in FIG. 6, there is no connection (edge information) between the existing nodes and the new node.

Figure 7:
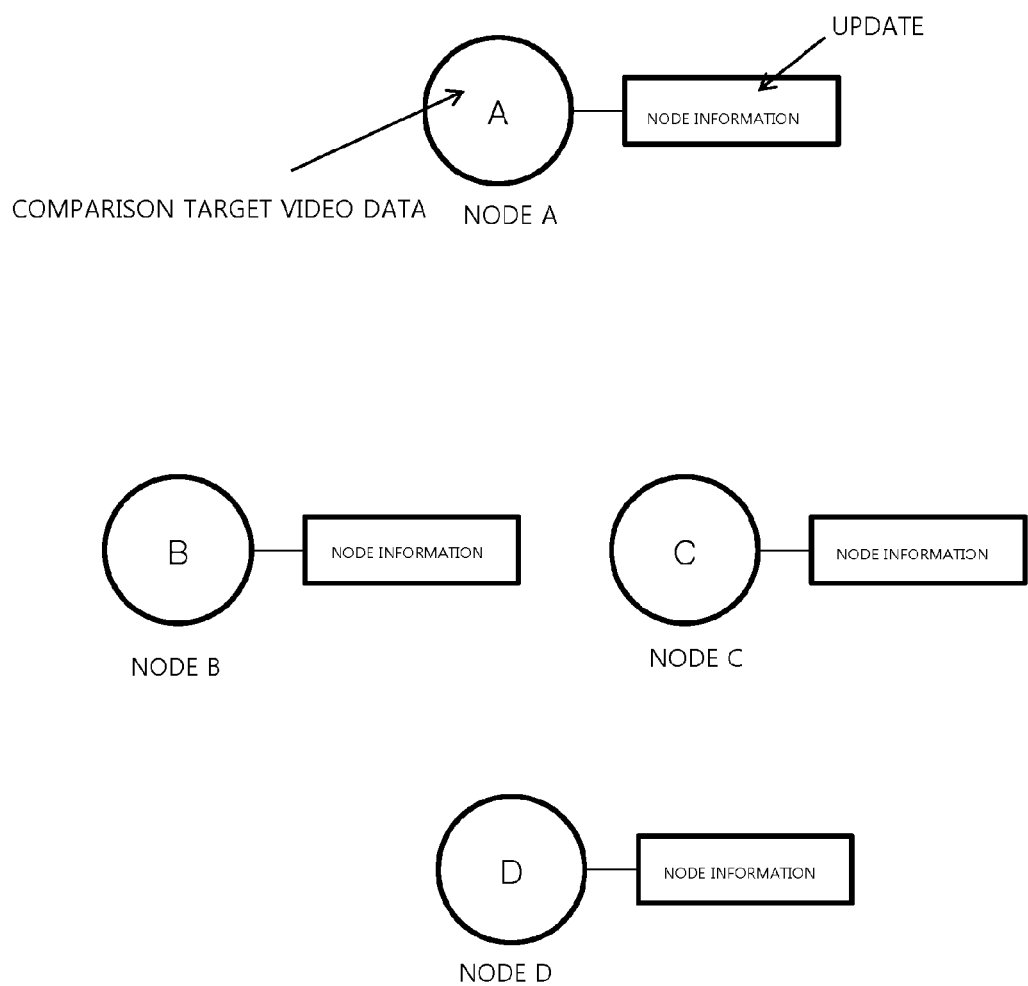

Next, if the mutual relation is set as a case where the comparison target video data is completely identical to one of pieces of video data of respective nodes ((b) of FIG. 5), the comparison target video data is included in a node including the completely identical video data, and node information about the node is updated. For example, in a state in which nodes are generated, as shown in FIG. 2, if the comparison target video data is completely identical to the video data of existing node A, the comparison target video data must be merged into node A, so that node information about node A is updated. In this case, the updated node information may be only location information (see FIG. 2) that is added. Even in this case, since relations with other nodes are not changed, there is no need to update edge information, as described above in the case of the relation of difference. This case is shown in FIG. 7.

Next, in a case where the comparison target video data partially overlaps at least one of the pieces of video data of the respective nodes ((c), (d), (e), and (f) of FIG. 5), how the pieces of video data overlap each other, that is, an overlapping shape among shapes in (c), (d), (e), and (f) of FIG. 5, is firstly set, a new node is generated, the comparison target video data is included in the generated new node, and node information about the new node is recorded. This procedure is same to that of the above-described case of the relation of difference.

Figures 8, 9, 10:
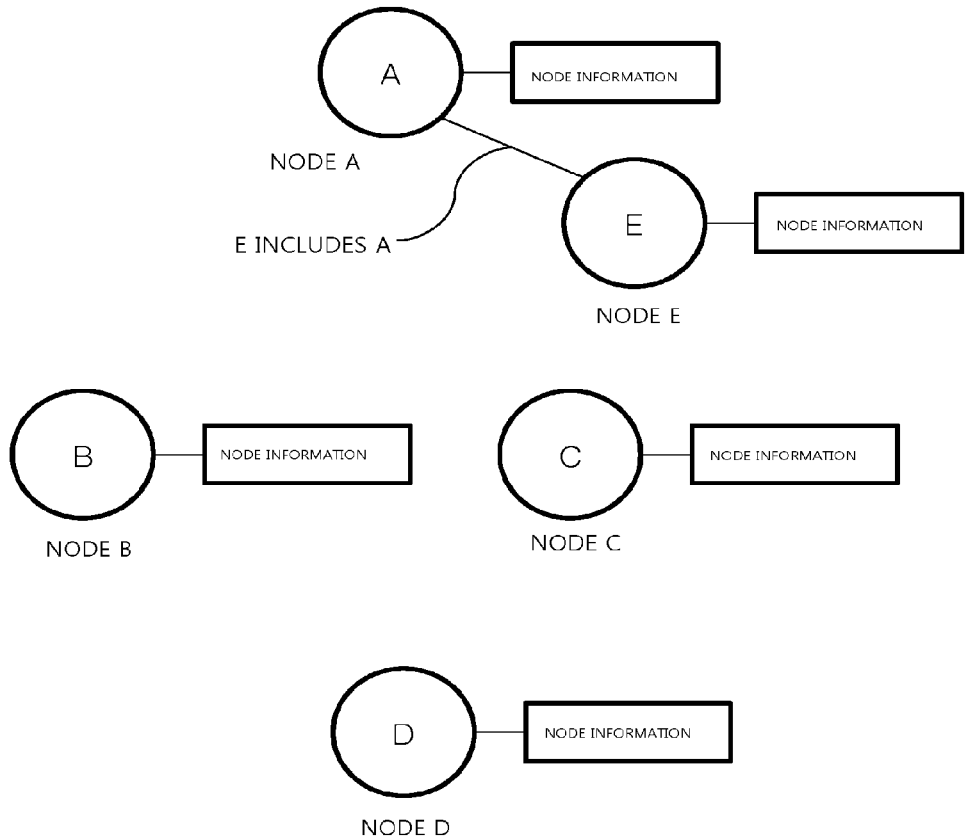
FIGS. 9 and 10 are diagrams showing examples of node information.

Next, pieces of node information about all existing nodes having the relation of partially overlapping with the comparison target video data are updated in correspondence with the respective overlapping cases ((c), (d), (e), and (f) of FIG. 5), and node information about the generated new node is updated in correspondence with each overlapping case. For example, as shown in FIG. 8, when a new node is node E, and there is a relation in which the video data of node E includes the video data of node A, information indicating that node A is included in node E is first recorded in an edge information field (see FIG. 4) included in the node information of node A. In this case, the updated edge information and node information about node A can be indicated, as shown in FIG. 9. Then, node information about node E is updated, and this updating can be performed by recording information indicating that node E includes node A. In this case, the updated edge information and node information about node E can be indicated, as shown in FIG. 10.

Figures 11, 12:
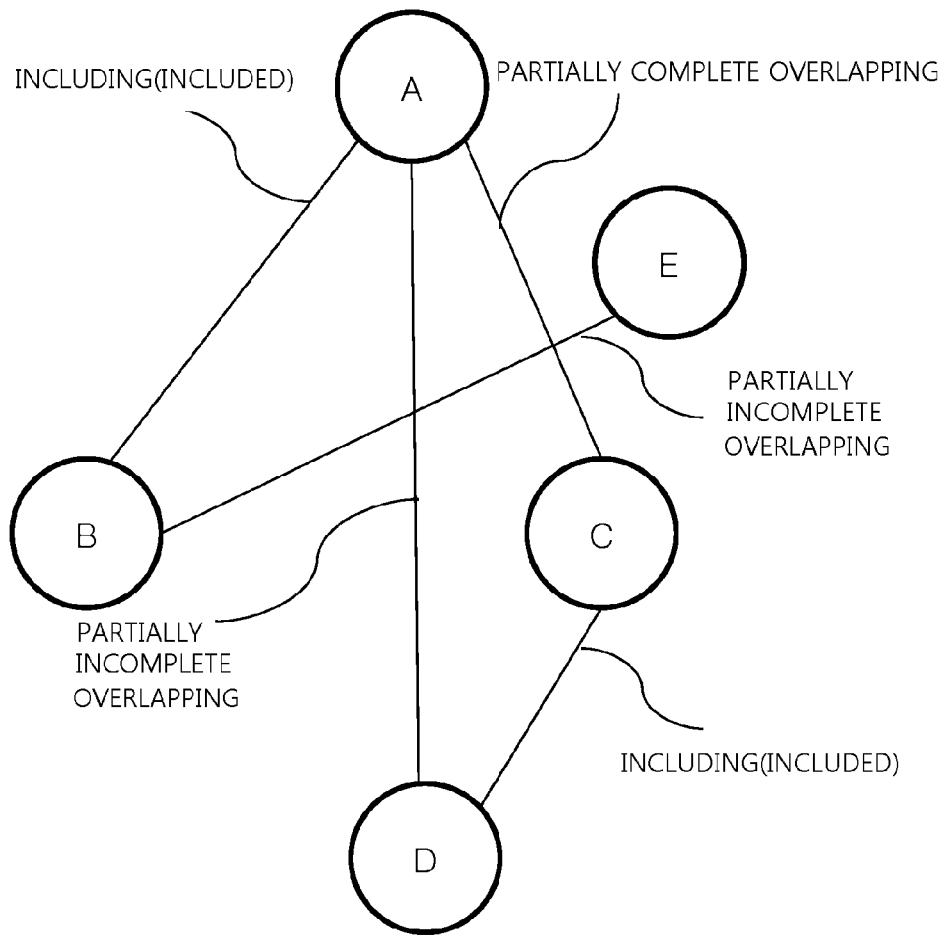
FIG. 11 is a diagram illustrating only edge information of node information for the node IDs of a video DB.
FIG. 12 is a diagram showing mutual relations between nodes in the form of a graph.

When such a procedure is performed on pieces of comparison target video data that are newly input, a video DB in which relations among all pieces of video data can be determined depending on mutual relations for respective nodes can be constructed. FIG. 11 illustrates only edge information of node information for each node ID of the video DB constructed through the above procedure. Referring to FIG. 11, it can be seen that, as represented in edge information for each node, nodes A to E have mutual relations, such as including, partially complete overlapping, partially incomplete overlapping, or being included, as edge information based on mutual relations with other nodes. When such information is represented as a graph, it can be seen as shown in FIG. 12. By this graph, mutual relations between the nodes may be conveniently determined, and other nodes having interrelations with any one node may be efficiently searched for using the information shown in FIGS. 11 and 12.

Figure 13:
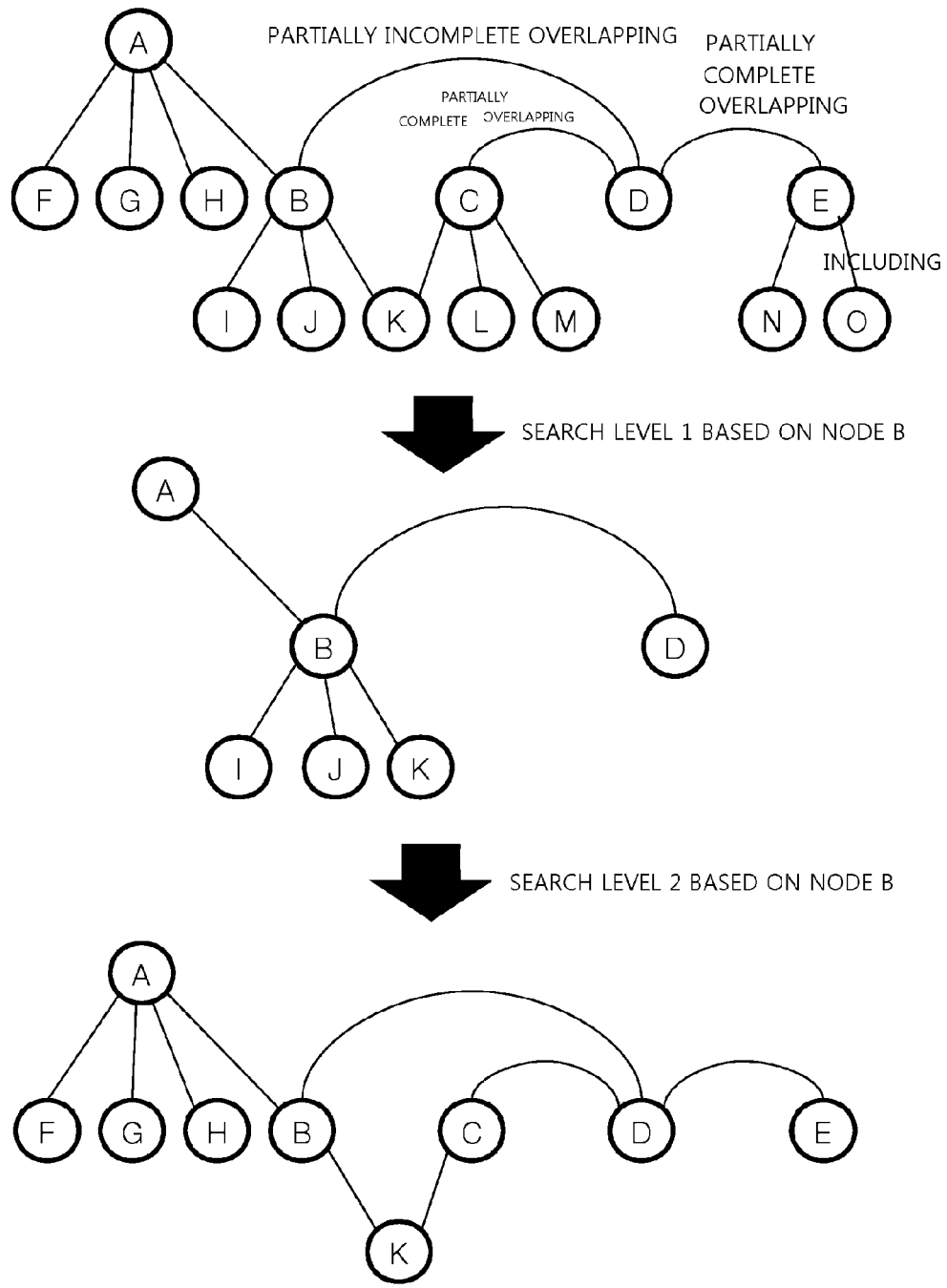
FIG. 13 is a diagram showing an embodiment of a method of searching the video DB constructed according to the present invention for video data.

FIG. 13 is a diagram showing an embodiment of a method of searching the video DB, constructed as described above, for video data.

Referring to FIG. 13, nodes ranging from A to O are generated, and mutual relations between the nodes are shown. Nodes represented in a vertical relationship in FIG. 13 indicate a relation in which a node at an upper level include nodes at a lower level (a relation in which the nodes at the lower level are included in the node at the upper level), and nodes in the same horizontal line have a relation in which they are different from each other or partially overlap each other. In FIG. 13, node A, for example, includes nodes B, F, G, and H, node B includes nodes I, J, and K and has the relation of partially incompletely overlapping with node D (see FIG. 5), and node C includes nodes K, L, and M and has the relation of partially completely overlapping with node D (see FIG. 5). Further, it can be seen that node D has the relation of partially completely overlapping with node E, and node E includes nodes N and O.

In this state, a procedure for obtaining a set of nodes connected via a maximum of n intermediate nodes based on node B is described as follows. First, node IDs of nodes (nodes A, D, I, J, and K) directly connected to node B are checked by referring to edge information included in node information about node B. Next, node IDs of nodes (nodes F, G, H, C, and E) directly connected to the directly connected nodes are obtained by referring to the edge information of the node information of the checked node IDs. When this procedure is repeated n times, a set of nodes connected via a maximum of n intermediate nodes based on node B can be obtained. Mutual relations with other nodes based on node B may be efficiently determined using the obtained nodes. These mutual relations may be arranged into a separate DB so that they can be efficiently used to search for video data itself or perform advertising, marketing and tracking.

FIGS. 14 to 17 are diagrams illustrating several characteristic shapes that may appear when the video DB is constructed according to the present invention. Rectangles in the drawings denote nodes, and arrows denote edges.

Figure 14:
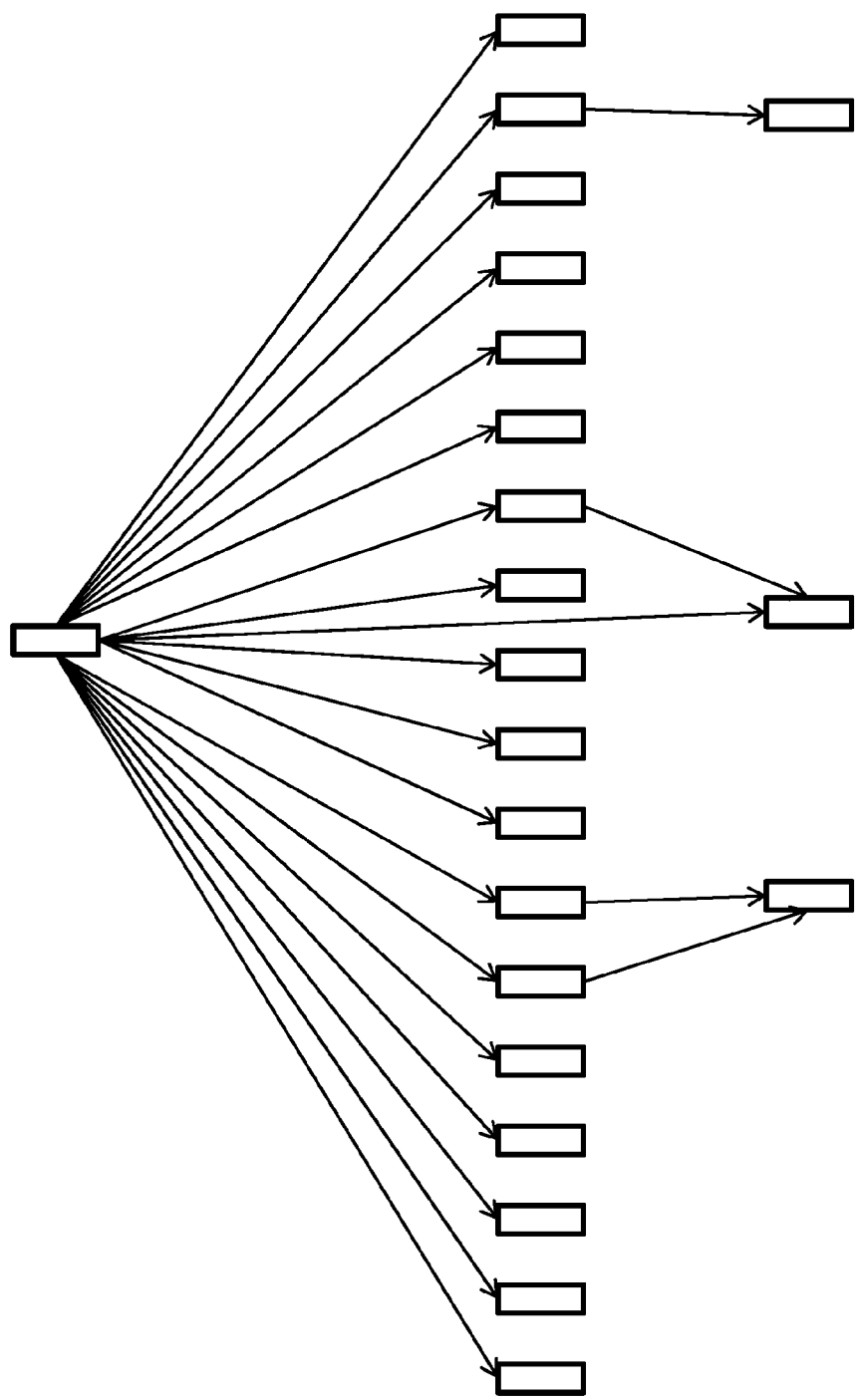
FIGS. 14 to 17 are diagrams illustrating nodes having several characteristic shapes that may appear when video data is generated according to the present invention.

FIG. 14 is a diagram showing a case where a single node includes a plurality of other nodes and the other nodes have little relationship therebetween. The case of FIG. 14 shows a shape frequently appearing in a broadcast program divided into a plurality of independent sections.

Figure 15:
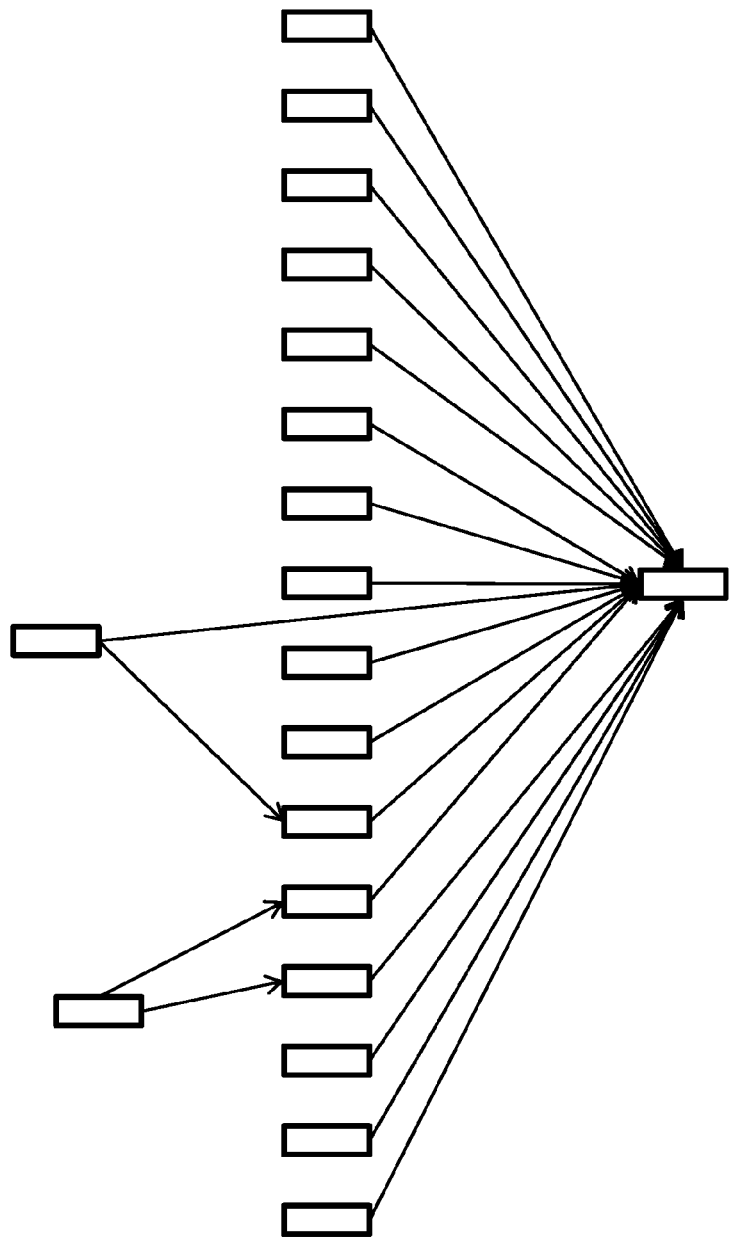

FIG. 15 illustrates a case where a single node is included in a plurality of other nodes, and the other nodes has little relationship therebetween. The case of FIG. 15 shows a shape frequently appearing in pictures, such as an animated feature or a drama including the same opening/ending scenes.

Figure 16:
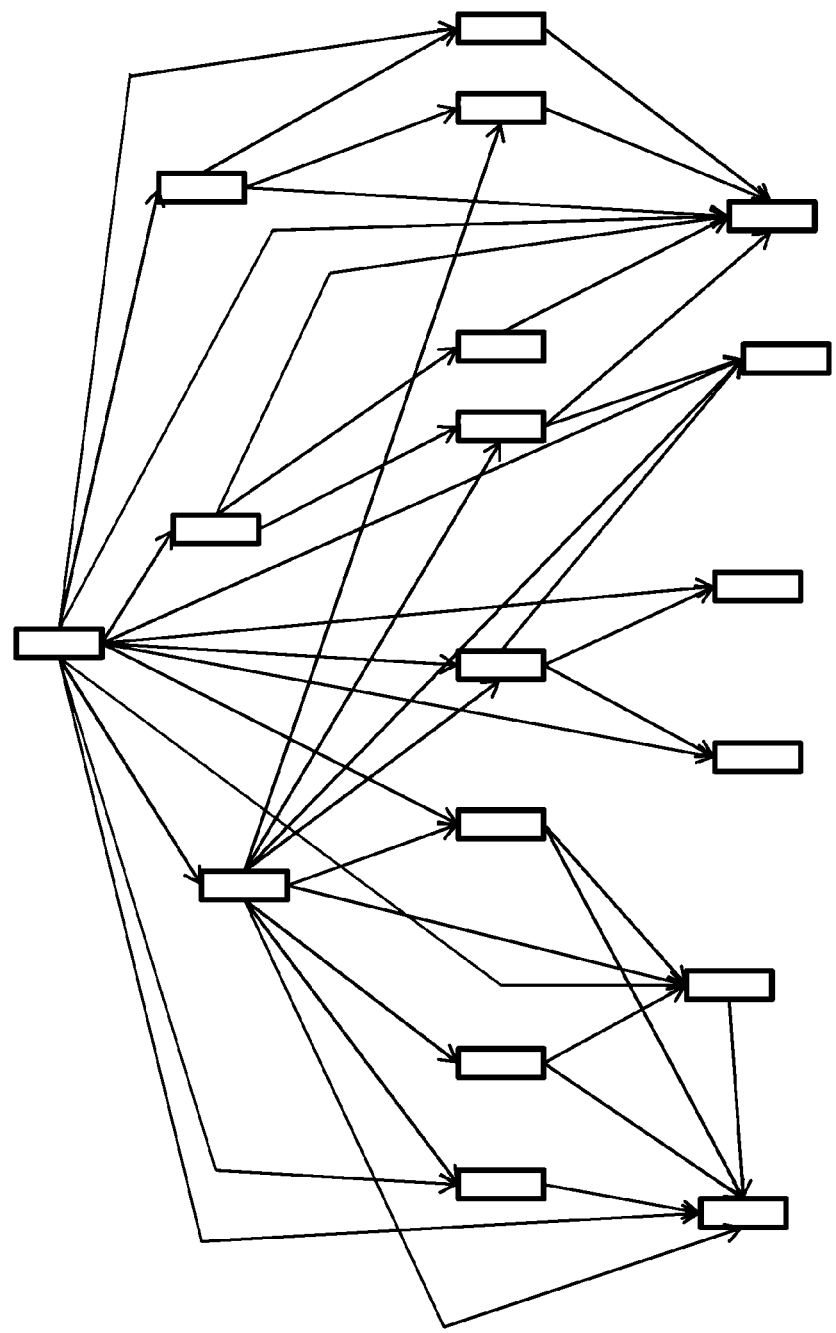

FIG. 16 illustrates a case where a plurality of nodes are included in a single node, but very complicated relations are formed between the plurality of nodes in secondary searching. The case of FIG. 16 shows a shape frequently appearing in famous video data in which a plurality of edited highlights having different lengths or video qualities are present. FIG. 16 shows that "Paparazzi" which is a music video of a singer named "Lady Gaga" is arranged into a video DB, wherein the leftmost node is an original music video, and nodes in right sides correspond to edited versions of the original music video.

Figure 17:
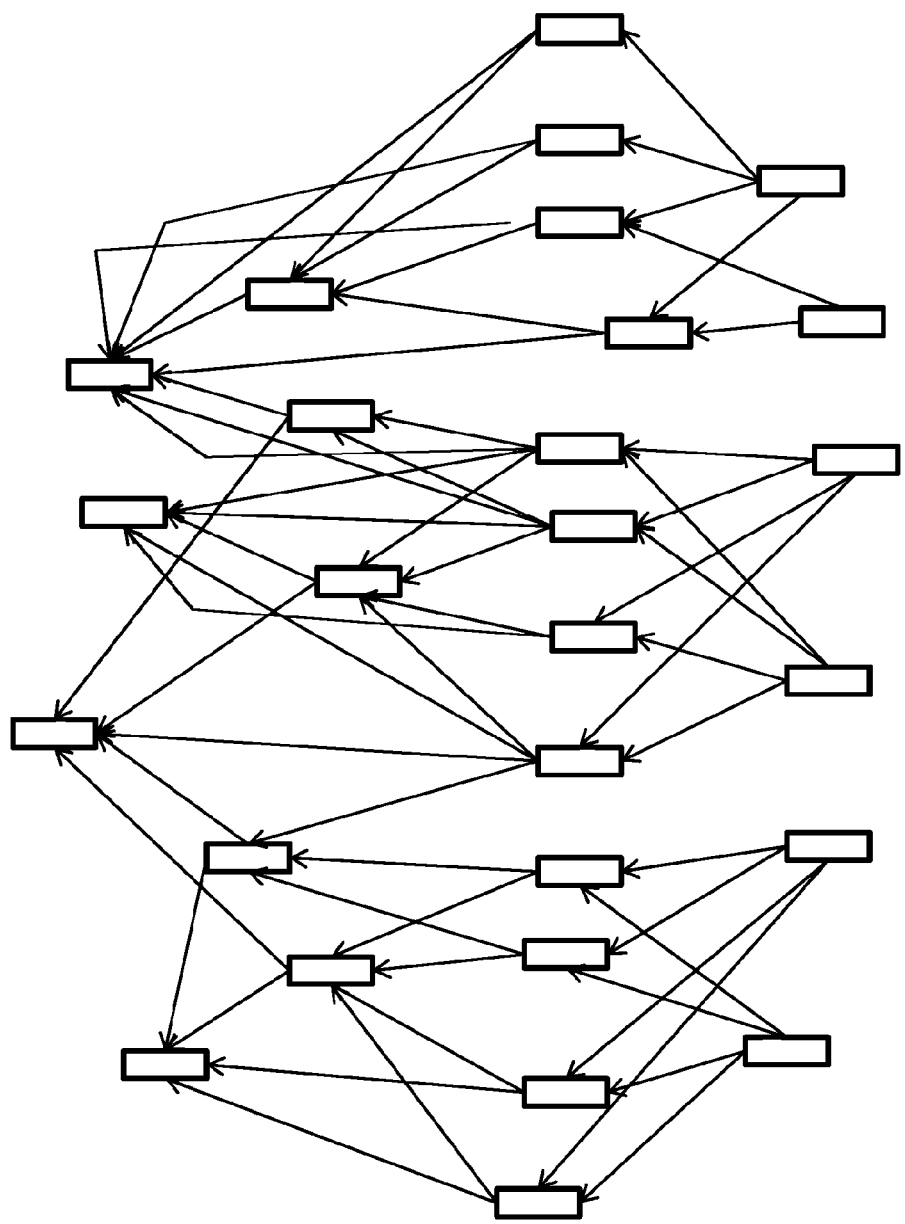

FIG. 17 illustrates a case where 'including' relations are gathered in several terminal nodes via a complicated relation from a plurality of independent nodes through intermediate nodes, and shows a shape mainly appearing in a long series video product having many repetitions. In the shape of FIG. 17, highlights or good scenes frequently appearing over several installments are located in the terminal nodes, and most upper nodes denote adjacent episodes of the series. FIG. 17 illustrates an example of an animated feature named "One Piece."

The shapes of FIGS. 14 to 17 are exemplarily shown for the convenience of description, but, in practice, shapes may appear in a more complicated form than those of the drawings.

In the above description, although preferred embodiments of the present invention have been described with reference to the detailed description and drawings, the present invention is not limited by those embodiments, and those skilled in the art to which the present invention pertains will appreciate that various modifications and other equivalent embodiments are possible from the above embodiments. Accordingly, it should be noted that the scope of the present invention should be defined by the technical spirit of the accompanying claims.

What is claimed is:

1. A method of constructing a database (DB) based on mutual relations between pieces of video data, comprising:
   1) generating one or more nodes so that pieces of identical video data are included in an identical node;
   2) generating pieces of node information about respective generated nodes;
   3) comparing comparison target video data with pieces of video data of the respective nodes, and then setting relations between the comparison target video data and the pieces of video data of the respective nodes; and
   4) updating pieces of node information about the respective nodes, based on the set relations;
   wherein each relation between the comparison target video data and the pieces of video data set at 3) corresponds to at least one of a case where the comparison target video data is different from all of the pieces of video data of the respective nodes, a case where the comparison target video data is completely identical to one of the pieces of video data of the respective nodes, and a case where the comparison target video data partially overlaps at least one of the pieces of video data of the respective nodes; and wherein the case where the comparison target video data partially overlaps at least one of the pieces of video data of the respective nodes is one of a case where the comparison target video data includes at least one of the pieces of video data of the respective nodes, a case where the comparison target video data is included in at least one of the pieces of video data of the respective nodes, a case where a part of the comparison target video data completely overlaps at least one of the pieces of video data of the respective nodes, and a case where a part of the comparison target video data incompletely overlaps at least one of the pieces of video data of the respective nodes.

2. The method of claim 1, wherein the node information at 2) includes node identifier information uniquely assigned to each node.

3. The method of claim 1, wherein the node information at 2) includes information about a physical location at which the video data is located.

4. The method of claim 1, wherein if the relation is set as the case where the comparison target video data is different from all of the pieces of video data of the respective nodes, 4) is configured such that a new node is generated, the comparison target video data is included in the new node, and node information about the new node is generated.

5. The method of claim 1, wherein if the relation is set as the case where the comparison target video data is completely identical to one of the pieces of video data of the respective nodes, 4) is configured such that the comparison target video data is included in a node including the completely identical video data, and node information about the node is updated.

6. The method of claim 1, wherein 4) comprises:
 4-1) determining to which one of the overlapping cases a current case corresponds;
 4-2) generating a new node;
 4-3) updating node information about the overlapping nodes in correspondence with each overlapping case; and
 4-4) updating node information about the new node in correspondence with each overlapping case.

7. The method of claim 6, wherein 4-3) and 4-4) are configured to generate information about each overlapping case as edge information indicating a connecting relationship between the new node and the overlapping nodes, and update the edge information so that the edge information is included in the node information.

8. A system for constructing a database (DB) based on mutual relations between pieces of video data, comprising:
 at least one computer processor for executing commands that direct operations of the system and a memory operatively coupled to the at least one processor, the memory storing code operable when executed with the at least one processor;
 a comparison unit for comparing comparison target video data with pieces of video data stored in a DB, and setting mutual relations between the pieces of video data;
 a DB management unit for generating one or more nodes and pieces of node information so that pieces of identical video data are included in an identical node, and managing pieces of node information about respective nodes based on mutual relations set by the comparison unit comparing the comparison target video data with the pieces of video data stored in the DB; and
 the DB for storing the nodes and the node information generated by the DB management unit, and storing the pieces of video data in correspondence with respective nodes, based on related data generated and updated by the DB management unit depending on the mutual relations set by the comparison unit;

wherein the comparison unit compares the comparison target video data with the pieces of video data of the nodes stored in the DB, and sets each mutual relation as at least one of a case where the comparison target video data is different from all of the pieces of video data of the respective nodes, a case where the comparison target video data is completely identical to one of the pieces of video data of the respective nodes, and a case where the comparison target video data partially overlaps at least one of the pieces of video data of the respective nodes; and wherein the case where the comparison target video data partially overlaps at least one of the pieces of video data of the respective nodes is one of a case where the comparison target video data includes at least one of the pieces of video data of the respective nodes, a case where the comparison target video data is included in at least one of the pieces of video data of the respective nodes, a case where a part of the comparison target video data completely overlaps at least one of the pieces of video data of the respective nodes, and a case where a part of the comparison target video data incompletely overlaps at least one of the pieces of video data of the respective nodes.

9. The system of claim 8, wherein if the mutual relation is set as the case where the comparison target video data is different from all of the pieces of video data of the respective nodes, the DB management unit is configured such that a new node is generated, the comparison target video data is included in the new node, and node information about the new node is generated.

10. The system of claim 8, wherein if the mutual relation is set as the case where the comparison target video data is completely identical to one of the pieces of video data of the respective nodes, the DB management unit is configured such that the comparison target video data is included in a node including the completely identical video data, and node information about the node is updated.

11. The system of claim 8, wherein the DB management unit determines to which one of the overlapping cases a current case corresponds, generates a new node, updates node information about the overlapping nodes in correspondence with each overlapping case, and updates node information about the new node in correspondence with each overlapping case.

* * * * *